(12) United States Patent
Fossati et al.

(10) Patent No.: US 7,669,591 B2
(45) Date of Patent: Mar. 2, 2010

(54) STEAM GENERATOR FOR COOKING APPARATUS

(75) Inventors: Laura Fossati, Travedona Monate (IT); Davide Parachini, Cassano Magnago (IT); Nicola Bedetti, Como (IT); Robert Eckstein, Ranco (IT); Willemen Mauritz, Utrecht (NL)

(73) Assignee: Whirlpool Corporation, Benton Harbor, MI (US)

( * ) Notice: Subject to any disclaimer, the term of this patent is extended or adjusted under 35 U.S.C. 154(b) by 1140 days.

(21) Appl. No.: 11/281,828

(22) Filed: Nov. 17, 2005

(65) Prior Publication Data

US 2006/0108433 A1    May 25, 2006

(30) Foreign Application Priority Data

Nov. 19, 2004    (EP)    ................... 04105916

(51) Int. Cl.
*F24H 1/18* (2006.01)
*F24D 1/00* (2006.01)
*A21B 3/13* (2006.01)
*A47J 27/00* (2006.01)
*H05B 6/64* (2006.01)
*A21B 1/00* (2006.01)

(52) U.S. Cl. .................. 126/348; 126/369; 99/324; 99/330; 219/682; 219/401

(58) Field of Classification Search ............... 126/348, 126/369, 349; 99/324, 330, 331, 474; 219/682; 236/44 C See application file for complete search history.

(56) References Cited

U.S. PATENT DOCUMENTS 4,624,117 A    11/1986    Ory et al. .................. 68/3
6,453,802 B1 *    9/2002    Manganiello et al. ......... 99/330

FOREIGN PATENT DOCUMENTS

| DE | 7911823 | | 7/1979 |
|---|---|---|---|
| DE | 3703814 | A1 | 8/1988 |
| DE | 4309240 | A1 * | 9/1994 |
| DE | 4428197 | | 2/1996 |
| DE | 19629884 | | 1/1998 |
| EP | 0508942 | A2 | 10/1992 |
| GB | 2325396 | A * | 11/1998 |
| JP | 2002125858 | A * | 5/2002 |

* cited by examiner

*Primary Examiner*—Chen-Wen Jiang
(74) *Attorney, Agent, or Firm*—John Morrison; McGarry Bair P.C.

(57) ABSTRACT

According to the invention, a steam generator is provided with a housing for forming a steam generating chamber, the housing having a steam outlet port. A heater plate is supported by the housing within the steam generating chamber. A water inlet valve is fluidly connected to the housing for selectively supplying water into the steam generating chamber whereby water is directed to the heater plate for conversion to steam. The heater plate forms a bottom wall of the steam generating chamber and is arranged to have a high point. The water inlet valve is opened and closed in accord with a duty cycle which alternates between two phases: a fill phase duty cycle and a steady state duty cycle.

15 Claims, 7 Drawing Sheets

STEAM GENERATOR FOR COOKING APPARATUS

The present invention relates to a steam generating mechanism for use in a cooking application and more particularly to a steam generator for use with a cooking apparatus, such as a cooking sink, microwave oven or conventional oven, which can provide steam cooking capability.

BACKGROUND OF THE INVENTION

It is sometimes preferable for particular kinds of foods to be cooked using steam. Accordingly, conventional ovens and microwaves have sometimes been equipped with a steam generating mechanism in addition to a regular heating means. Additionally, it is known to provide sinks with cooking capabilities including having a steam generator which provides steam into the cooking sink.

Conventionally there has been introduced a wide variety of steam generating mechanisms into the market, which can be characterized into different categories.

One type of steam generating mechanism which is typically used in an oven, has a means for providing water into the bottom portion of an oven cavity. An oven heater is installed into the bottom of the oven cavity and operates to heat the water so as to generate steam into the chamber.

Another type of steam generating mechanism employs a configuration in which the water is injected over a heater to generate steam. U.S. Pat. No. 6,318,246 illustrates such a system, wherein a water supply tube directs water toward a suction side of a fan where air and water is sucked by the fan and is dispersed toward a heater so that water is formed into steam.

U.S. Pat. No. 4,741,261 discloses another type of steam generating mechanism. In this reference, a steam generator is arranged outside of a cooking pot and is connected to the pot so that steam generated by the steam supply can be directed into the cooking pot. A valve assembly between the steam generator and the cooking pot controls the introduction of steam into the pot.

SUMMARY OF THE INVENTION

According to the invention, a steam generator is provided having a housing for forming a steam generating chamber, the housing having a steam outlet port. A heater plate is supported by the housing within the steam generating chamber or cavity. A water inlet valve is fluidly connected to the housing for selectively supplying water into the steam generating chamber whereby water is directed to the heater plate for conversion to steam. The heater plate forms a bottom wall of the steam generating chamber and is arranged to have a high point.

The water inlet valve is opened and closed in accord with a duty cycle which alternates between two phases: a fill phase duty cycle and a steady state duty cycle. The steady state duty cycle is relatively slower than the fill phase duty cycle such that during the fill phase water the level of water in the steam generating chamber rises and in the steady state phase the level of water in the steam generating chamber decreases.

In a boil dry condition (over threshold), the high point of the heater plate begins to overheat first such that a temperature sensor mounted to the heater plate at the high end of the heater plate can operate to prevent overheating of the heater plate. It is also possible to sense for leakage current to allow for safe operation of the steam generator at critical heat flux, thus ensuring a high efficiency and fast steam generation.

BRIEF DESCRIPTION OF THE DRAWINGS

The present invention will be more apparent from the accompanying drawings, which are provided by way of non-limiting example and in which.

DESCRIPTION OF THE PREFERRED EMBODIMENTS

Figure 1:
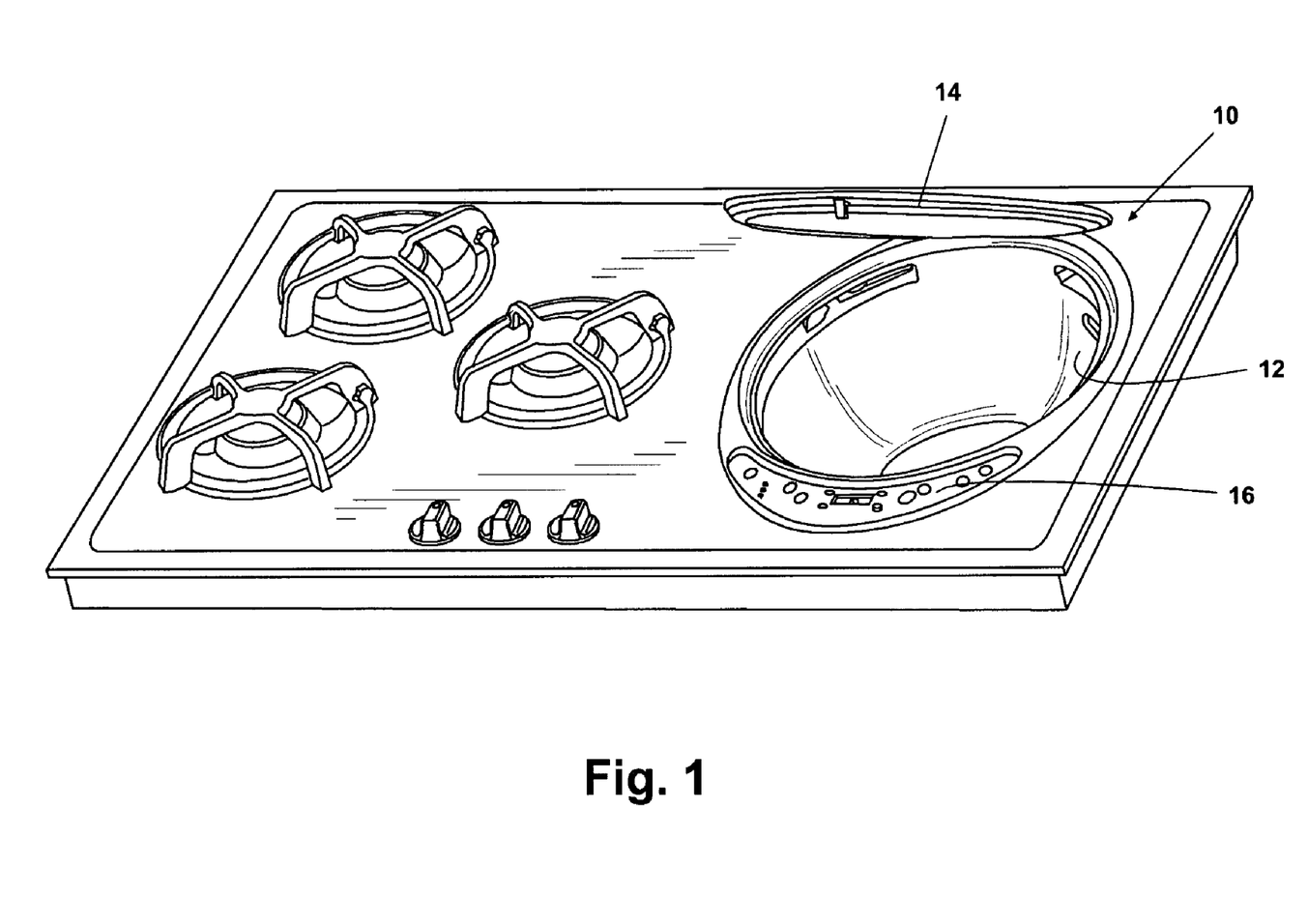
FIG. 1 is a perspective view of a cooking apparatus having a steam generator embodying the principles of the present invention.

With reference to FIG. 1, there is shown a cooking apparatus 10 having a steam generator in accordance with the present invention. The cooking apparatus 10 includes of a bowl or sink-like cooking chamber 12 set into an upper surface of a counter top. A lid 14 is provided hingedly supported above the cooking chamber 12. Alternatively, the lid 14 may be a separate element and not hingedly connected to the cooking chamber. The cooking chamber 12 is designed to receive various types of cooking utensils, such as a perforated basket (not shown). A user interface 16 which can include a set of controls and indicator lamps, is provided for the cooking apparatus. These controls or user interface 16 may be preferably located along the peripheral edge of the cooking chamber 12 although they can also be separated from the body of the cooking apparatus. The cooking apparatus 10 may be a "stand alone" device or may be incorporated into a cook top or cooking hob with conventional burners.

Figure 2:
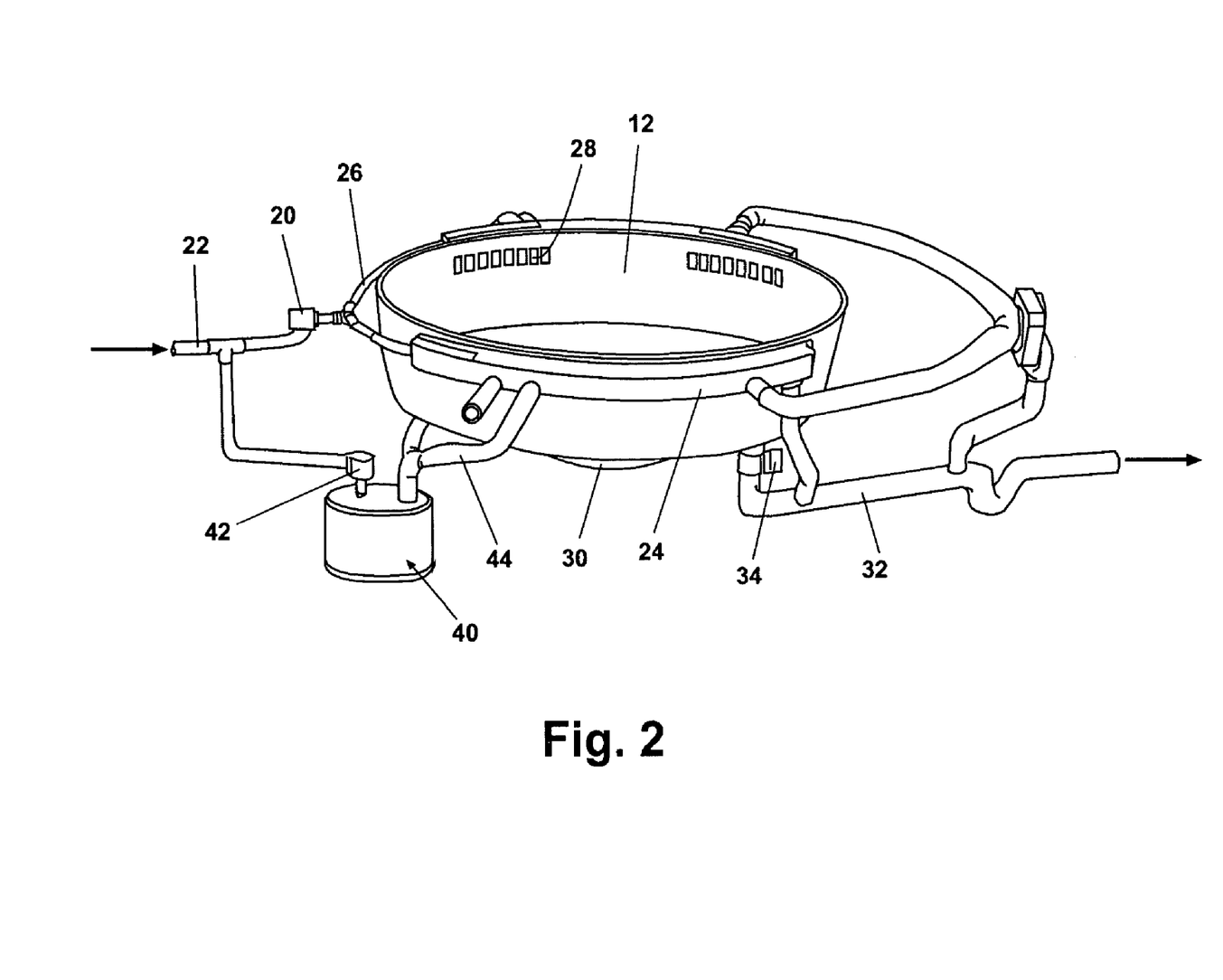
FIG. 2. is a schematic illustration of the cooking apparatus showing the major components of the cooking apparatus, including a steam generator according to the present invention.

FIG. 2 shows various elements of the cooking apparatus 10 in greater detail. It should be understood that FIG. 2 is schematic in nature and does not illustrate the particular appearance or configuration that may be used in a commercial implementation of the present invention. The cooking chamber or sink 12 is designed to receive water and/or steam depending on the cooking select. A water valve 20 is provided on a water inlet supply 22 to regulate the supply of water into the cooking sink 12. Water supplied through the water valve 20 is directed through inlet tubes 26 inlet housings 24 which are provided along the top, upper edge of the cooking sink 12. Water flows into the cooking sink through the inlet ports 28 located along the upper edge of the cooking sink 12.

A heating element 30 is provided along the bottom surface of the steam generator 10. After water is added into the cooking chamber 12 the heater 30 can be used to heat the water for cooking food items placed in the cooking chamber. Alternatively, food items can be added into the cooking chamber and heated directly by the heating element such that the cooking chamber 12 functions as a pan to braise or brown food items. A drain pipe 32 extends from the bottom of the cooking chamber 12 for draining water from the chamber 12. A valve 34 is provided for selectively controlling the draining.

It is also possible to add other heating type systems to the cooking apparatus 10. For example, heating lamps (not shown) may be provided along the upper edge of the cooking chamber 12 or along the lid 14 to supply radiant energy into the cooking chamber 12. Alternatively, it is possible to direct MW energy into the cooking chamber.

A steam generator 40 is also provided for introducing steam into the cooking apparatus 10 in accordance with the invention. Water is supplied to the steam generator through the water inlet supply 22 which is controlled by a water valve 42. A steam conduit 44 provides a path for steam to flow from the steam generator 40 to the cooking chamber 12. The steam conduit 44 may be connected to the inlet housing such that steam is introduced from the chamber 12 via the inlet ports 28.

Figure 3:
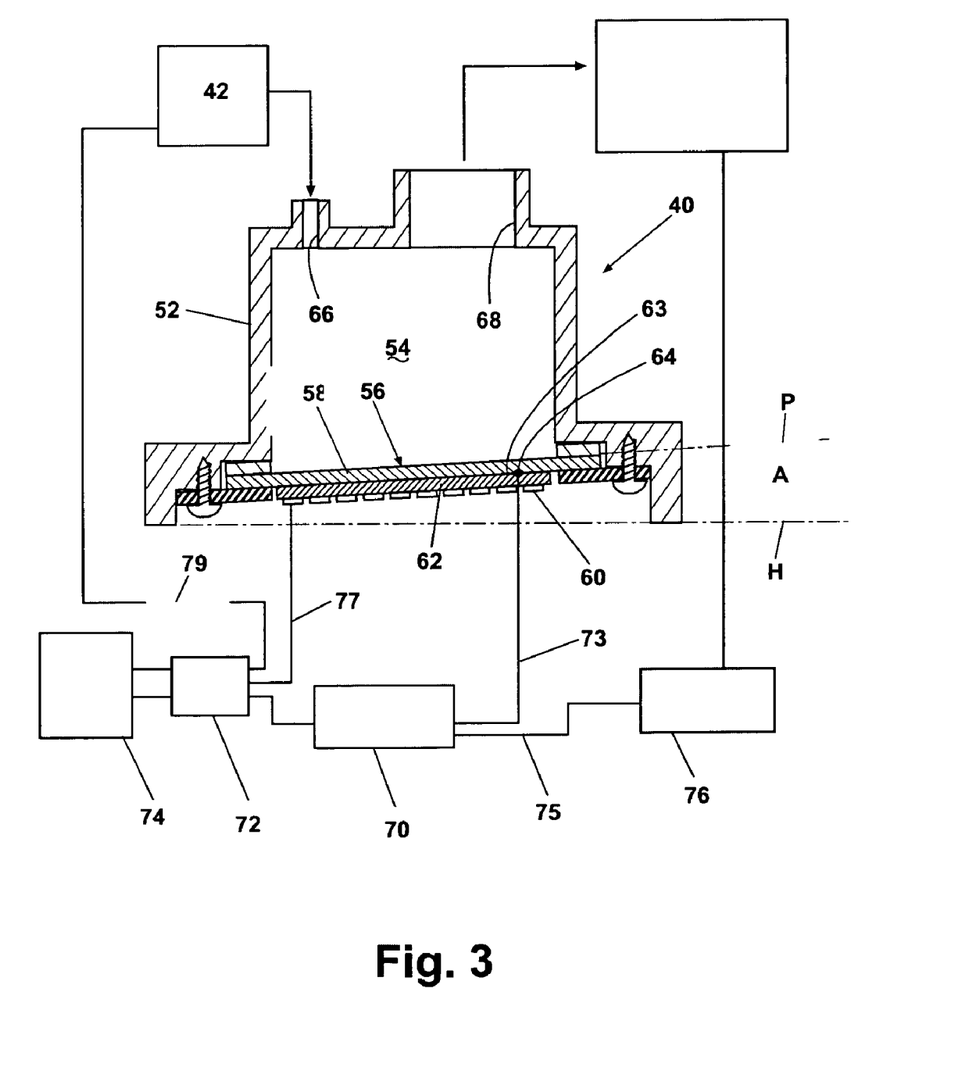
FIG. 3. is a schematic, cross-sectional view of the steam generator.

Turning to FIG. 3, the steam generator of the present invention is shown schematically. The steam generator 40 includes a casing or housing 52 which is preferably a plastic material with a low thermal mass. The housing 52 defines a steam generation cavity or chamber 54. A heater plate 56 forms a bottom wall of the steam generation cavity 54.

The heater plate 56 is composed by a metallic plate 58 on which a thick film heating element 60 is deposited upon a substrate layer 62 of ceramic material. The face of the metallic plate 58 opposite the thick film heating element 60 is directed toward the inner space or steam generation cavity 54. The use of a thick film heating element 60 allows for very quick heating as the thermal mass of the heater plate 56 is relatively small. Very fast water heating is also achieved because the thick film heater 60 allows for input of a large amount of energy into the cooking chamber. Finally, the temperature of the thick film heater 60 can be precisely controlled.

The heater plate 56 is arranged to have a high point 63. As shown in FIG. 3, the heater plate 56 may be mounted in such a way that it is placed on a plane P that is at an angle from the horizontal orientation H. In this way, the heater plate has a high end. The heater plate 56 is shown oriented at an angle via the configuration of the housing 52. However, this may be accomplished in any number of ways including through the use of mounting feet extending from the housing or through the use of a specially configured metallic plate 58. The present invention is directed to cover any method used for orientating the heater plate at an angle.

Figure 4:
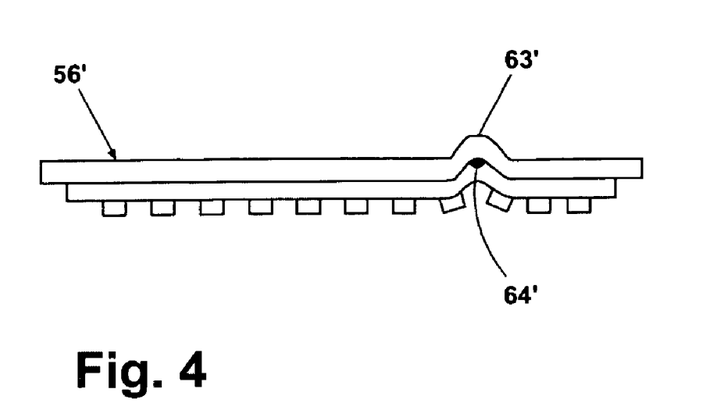
FIGS. 4 and 5 illustrate schematically alternate embodiments of the heater plate of the present invention.
Figure 5:
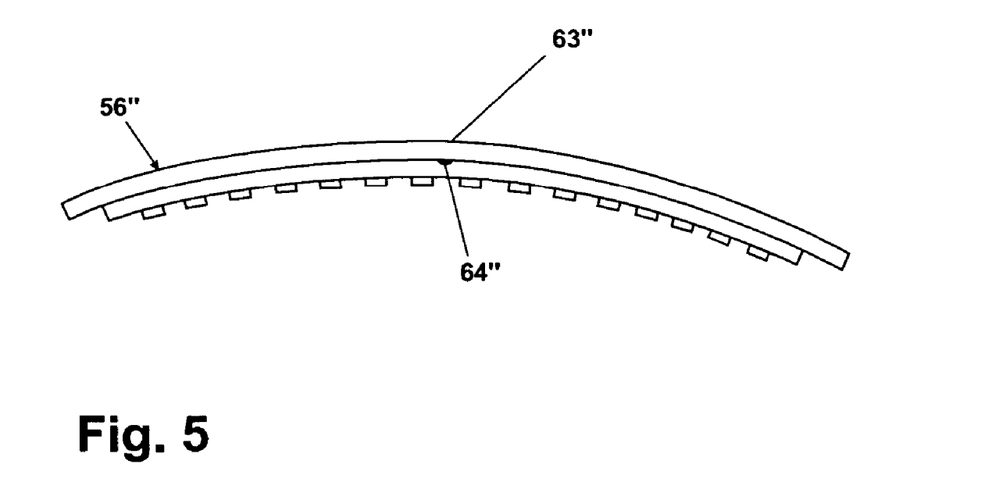

Alternatively, the heater plate may be arranged in other ways to achieve having a high point. In FIGS. 4 and 5, two alternate embodiments of the heater plate 56 is shown. In FIG. 4, the high point 63' is provided by forming a small upward protrusion or dimple in the heater plate 56'. In FIG. 5, the high point 63" is provided by bowing upwardly the middle portion of the heater plate 56".

Returning to FIG. 3, it is seen that provided within the housing 52 is an inlet water opening 66 through which water is added or sprayed into the steam cavity 54. The inlet opening 66 is fluidly connected to the water valve 42 for selectively controlling water inlet into the steam cavity 54. After water enters the steam cavity 54 heat from the heater plate 56 operates to heat water and convert water to steam. Steam then exits the steam generator 40 through steam outlet port or opening 68. The steam passes through the steam conduits 44 to the cooking chamber 12.

A temperature sensor 64 is mounted on the underside of the heater plate 56 at the high point 63 on the heater plate. In this way, the temperature sensor 64 is positioned to sense when the heater plate 56 begins to overheat. As long as sufficient water is present, the heater plate will not overheat. Overheating of the heater plate 56 will occur when the steam generator 40 begins to run dry. Since the highest part of the heater plate 56 will be the first to run dry, the temperature sensor 64 will be able to sense when the heater plate 56 first begins to overheat. A similar temperature sensor 64' and 64" can be provided in the alternate embodiments shown in FIGS. 4 and 5.

The inclusion and location of sensor 64 is designed to improve the likelihood of detecting a temperature rise above the critical heat flux point, but operates only at location 64. It is also possible to measure the current leakage between the heater element 60 (resistive track) and steel plate 58 to measure the critical heat flux temperature over the entire surface of heater plate 56. Current leakage will occur, over a predetermined minimum threshold, only in the event of a high temperature, over threshold condition, such that current leakage is a good measure of over-threshold temperature condition. In this way, two different types of over threshold sensing system can be employed.

Two key performance measures for the steam generator 40 are: 1) that it produce steam very fast; and 2) that it produce steam efficiently. In order to achieve these results the present invention provides a system to control the temperature and heat transfer of the heater plate 56, the amount of water in contact with the heater plate, and the speed at which the heating plate heats. Moreover, the inventors have discovered that in order for the steam generator 40 of the present invention to be capable of rapidly producing steam, it is beneficial to have a large surface area which is completely covered by water with a heater plate that is at temperature close to critical heat flux.

Figure 6A:
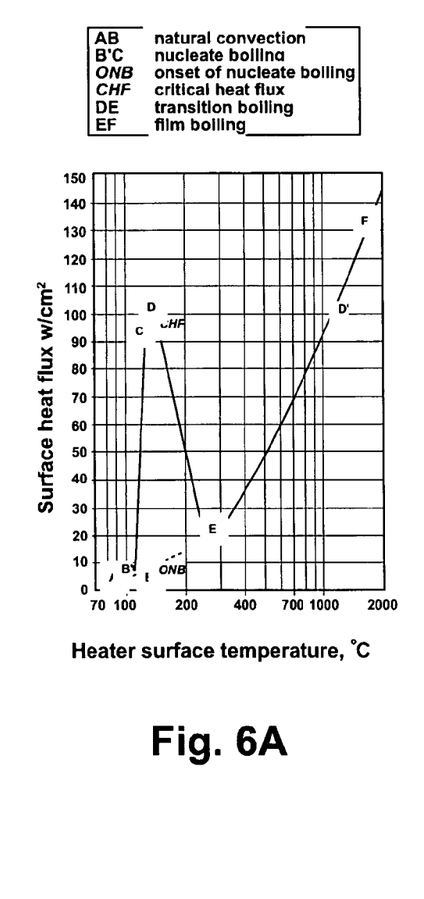
FIG. 6a is a graph showing the pool boiling curve for water at atmospheric pressure.
Figure 6B:
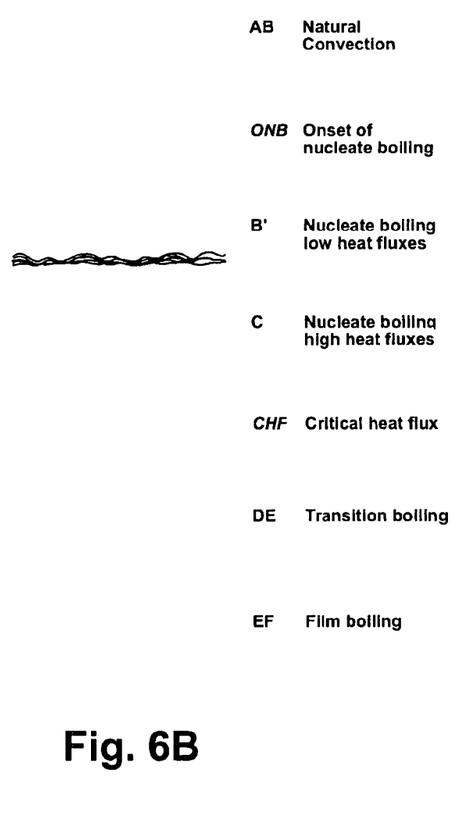
FIG. 6b is a schematic illustration of the various stages of the pool boiling curve.

Heat flux in this case of steam generation is typically the amount of heat, transferred to a liquid, per unit of time through a unit area. Generally, one may say that the critical heat flux is the condition where the steam generation rate approaches the most efficient possible. Boiling heat transfer is a convective process which involves a change of phase from liquid to vapour. There are two basic types of boiling: pool boiling and flow boiling. In general there appear to be three distinct regimes in pool boiling, these are the free convective evaporation regime, the nucleate boiling regime, and the film boiling regime. The heat transfer characteristics vary drastically from one regime to another. Nucleate boiling has a great practical value for fast steam generation because of the relatively high heat transfer rates. As the heating surface temperature is increased, vaporization will continue but bubbles will form on the heating surface at nucleation sites. As more and more bubbles break away from the heating surface, the liquid nearby is greatly agitated, resulting in a large increase of the heat transfer rate. However the heat transfer rate cannot be increased indefinitely since at some stage there will be so many bubbles covering the heated surface which will prevent the liquid from reaching the heated surface. Consequently there is a danger of burnout or "boiling crisis". The peak heat flux for nucleate boiling at this point is called the critical heat flux. Typically this point of "critical heat flux" occurs below the Leidenfrost point, or minimum surface temperature to support film boiling, since for film boiling the heated surface is covered with a layer of vapour preventing contact between the liquid and the heated surface. FIGS. 6a and 6b illustrate pool boiling curve and provide images of various stages in it, respectively.

Accordingly, in order to maximize speed and efficiency, it is desirable to control the temperature of the heater plate close to the critical heat flux temperature but not exceeding it. The critical heat flux temperature is dependent on atmospheric conditions as well as the characteristics of the water used, however it is approximately between 110° C. and 140° C., but could be higher or lower depending on environmental conditions and water characteristics.

To promote rapid water heating, especially during initial conditions it is also helpful to have only a small volume of water in contact with the heater plate. To achieve this end, it is necessary to arrange the heater plate 56 in such a way that only a small volume of water is sufficient to completely cover the heater plate 56, including the high point 63. In FIG. 3, it can be understood that it is important to have the angle A at which the heater plate is supported be relatively shallow. A steep angle, for example, 20° off horizontal, will lead to a relatively deep covering of water over the heater plate on the low end, contributing to a relatively large volume of water. Preferably, the heater plate is supported at an angle A from approximately just slightly greater than 0 to 10° off horizontal, in the case where the heater plate 56 is inclined. In the case where the heater plate 56 is configured in some alternate way to provide a high point, it is also necessary to minimize the amount of total water above the heater plate 56.

Figure 7:
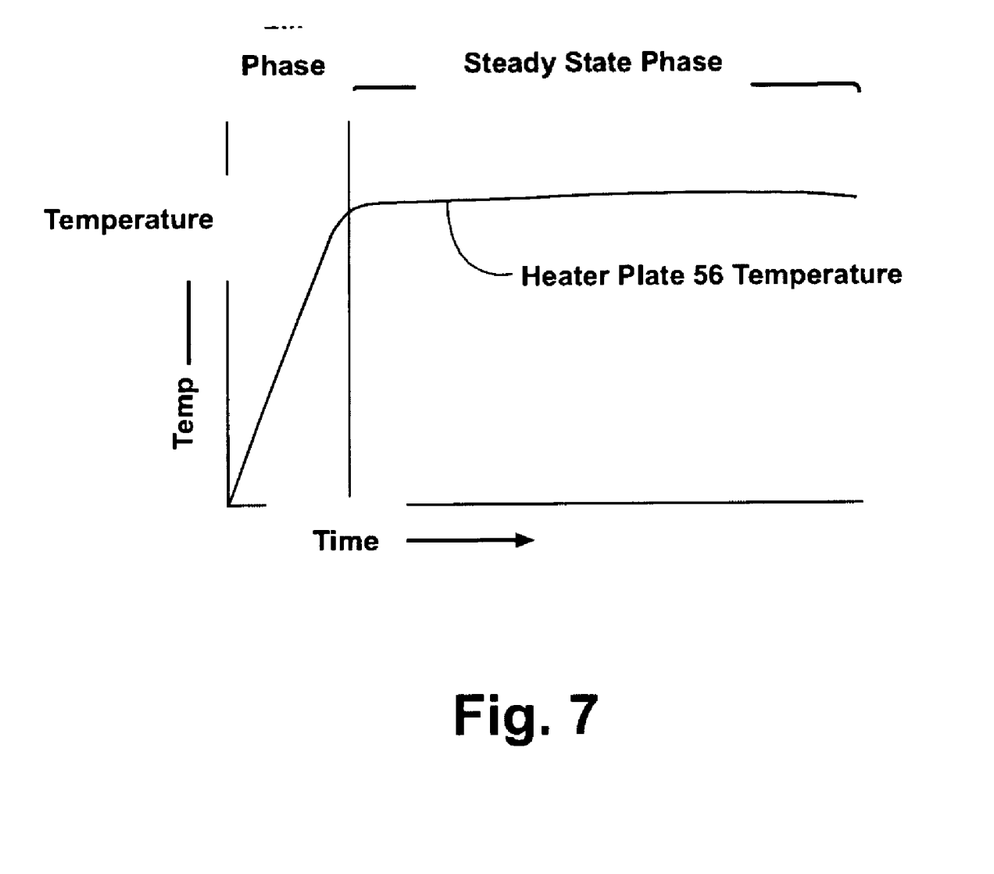
FIG. 7 is a graph showing the temperature control of the steam generator heater plate in accordance with the present invention.

The speed at which the heater plate 56 is heated is a function of heater type. In the present invention, the thick film heating element 60 provides for inputting a large amount of energy and extremely rapid heating response due to the low thermal mass of the heater plate 56. In FIG. 7, it can be seen that the heater plate 56 having the thick film heating element 60 is capable of heating to just below the critical heat flux temperature very rapidly and then entering a steady state temperature.

Figure 8:
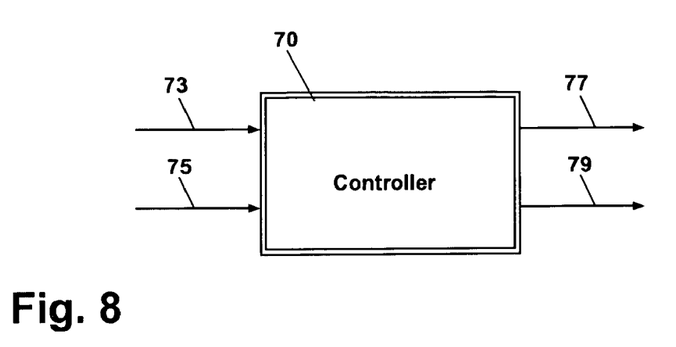
FIG. 8 is a schematic illustration of the inputs and outputs of the controller of the present invention.

Turning now to FIG. 3 and FIG. 8, it can be understood that the control system for the present invention includes a controller or control circuit 70 which analyzes temperature measurement signals from the temperature sensor 64 leakage current and other sensors and controls an electric switch 72 in response. The electric switch 72 is arranged between a power supply 74 and the heating element 60. If the control circuit 70 senses that the heater plate 56 is overheating, the supply of power to the heating element 60 be controlled, as well as flow rate of water entering chamber 54.

The controller 70 is able to produce in a short period of time (flash boiling) a first amount of steam perceived by the consumer and in the second time guarantee precisely the amount of steam required by the consumer. Looking at FIG. 7, it can be seen that the controller 70 has inputs from 1) the temperature of the sensor 64 placed on the bottom of the thick-film heater on line 73 and the user desired rate of steam on line 75. The controller 70 may also receive input regarding the leakage current as discussed above. The controller outputs include the heater element 60 duty cycle on line 77 and the water valve 42 duty cycle on line 79.

The supply of water into the steam generator can be separated into two main phases: the fill phase (flash boiling), and the steady-state phase. The fill phase is initiated upon start up of steam production to create a water film on the surface of the heater plate 56. During this phase, the controller 70 outputs a water valve duty cycle which pulses the water valve ON and OFF to rapidly provide this water film on the surface of the heater plate 56. During the fill phase, the controller 70 also outputs a duty cycle to the heater 60 to rapidly raise the temperature of the heater plate 56 to close to the critical heat flux for the water and is regulated for example by a PID temperature controller.

The steady-state phase staffs after the fill phase with a regulation control of the steam flow. The correlation between the amount of steam required by the consumer and the heater temperature surface pulse the ON/OFF switch on the inlet water valve 42. The steam flow regulation can be simple look-up tables or a more sophisticated closed loop system like a PID. During this phase, if leakage current is sensed or the temperature sensor 64 indicates an over threshold condition, the inlet water valve 42 can be cycled for a period of time at the higher rate employed during the fill phase to create again a water film on the entire surface of the heater.

Figure 9:
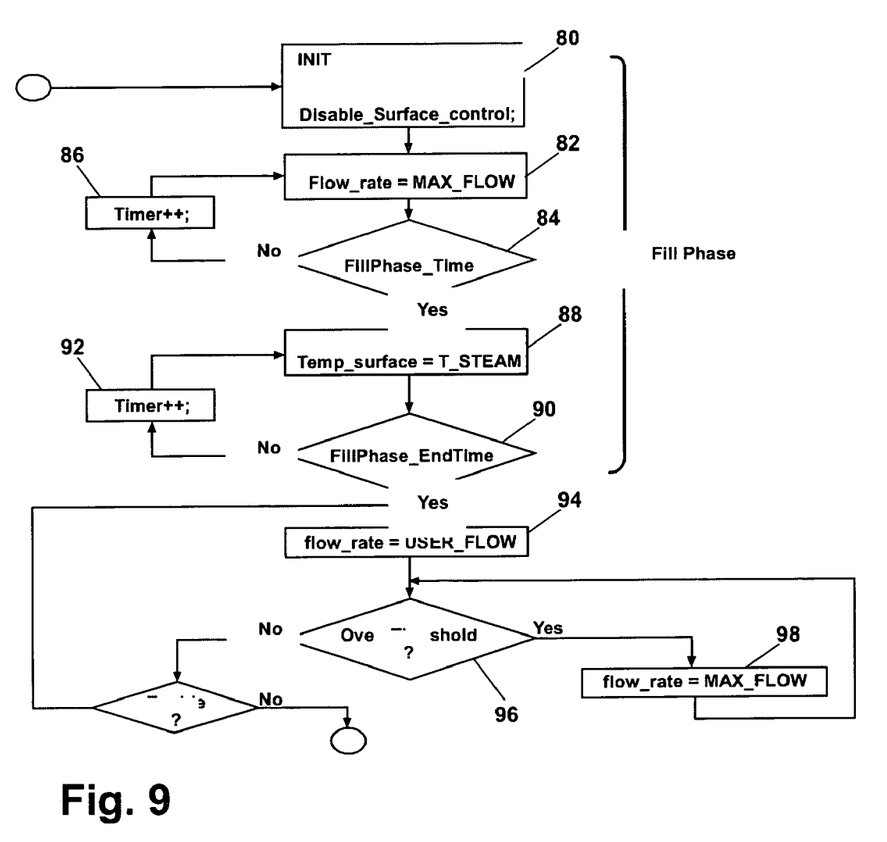
FIG. 9 is a flow chart illustrating the operation and control of the steam generator of the present invention.

The above description can be illustrated in a flow chart as shown in FIG. 9, where the fill phase (flash boiling) is described in steps 80-92. After a steam generation operation is initiated, as shown in step 80, a timer which can be part of the control circuit 70, is set to zero (TIME=0), the water valve 42 and heating element 60 are not energized. In step 82, the timer is initiated and the water valve 42 is pulsed to supply water into the steam cavity 54. The pulse rate for the water valve 42 is MAX_FLOW. Water is inlet in the steam cavity 54 a predetermined time as shown in steps 84 and 86.

After an initial time FillPhase_Time the controller 70 initiates heating the heater plate 56 by pulsing the heating element 60. The controller 70 outputs a duty cycle to the heater 60 to rapidly raise the temperature of the heater plate 56 to close to the critical temperature for the water and is regulated for example by a PID temperature controller.

After a predetermined time, Fillphase=EndTime, the flow rate of the water inlet valve 42 is reduced to a USER_FLOW rate 54 for a predetermined time as shown in step 94. This period is the steady-state phase referred to above. This steady-state phase continues for the period selected by the user and, as described above, the amount of steam required drives the duty rate of the water valve 42 and the duty rate of the heater 60.

As shown in steps 96 and 98, it can be seen that during the steady state operation, the temperature of the heater plate is monitored and in the event of an over-threshold temperature, an action is taken, such as increasing the rate of pulsing the water inlet valve. In particular, if leakage current is sensed or the temperature sensor 64 indicates an over threshold condition, the inlet water valve 42 can be cycled for a period of time at the higher MAX_FLOW employed during the flash-boiling phase to create again a water film on the entire surface of the heater.

As discussed above, the controller outputs a duty cycle to control the heating element 60. This duty cycle rate may be energized in accord with a user input to provide different levels of heat energy input. In this way, it is possible to control the amount of steam produced by the steam generator. To produce large quantities of steam, the heater is cycled at a high duty rate while a low duty cycle will produce less steam.

It can be seen, therefore, that the steam generator is able to operate safely with a relatively small amount of water provided above the heater plate 56 by switching the duty cycle of the water valve 42 between a fill phase and a steady state phase. This type of system allow water inlet control without the need for expensive and complicated control systems for monitoring the presence of water. This method of operation also provides for very fast steam generation. Due to the relatively shallow pool of water provided over the heater plate 56 and high efficiency, the water heats rapidly and quickly is converted to steam.

While the steam generator 40 is shown as part of a cooking apparatus 10 in the present application, it can be appreciated that the steam generator of the present invention may be used in any number of applications. For example, the steam generator may be used with a conventional or micro-wave oven.

Additionally, while the steam generator 40 has been shown as a "stand alone" type device, the steam generator of the present invention may also be incorporated as an integral part of a cooking apparatus or oven system. In such an integrated system, the controller 70 of the steam generator 40 may be incorporated as part of the controller for a cooking apparatus. For example, the controller 70 be formed as part of the user interface control 16.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A steam generator for producing steam, comprising:
    a housing for forming a steam generating chamber, the housing having a steam outlet port;
    a heater plate supported by the housing at an inclined angle from the horizontal within the steam generating chamber, the heater plate forming a bottom wall of the steam generating chamber and comprising a metallic plate on which a thick film heating element is supported;
    a water inlet valve fluidly connected to the housing for selectively supplying water into the steam generating chamber whereby water is directed to the heater plate for conversion to steam;
    a controller coupled to the thick film heating element to energize the thick film heating element to heat the heater plate to a temperature near, but not exceeding, the critical heat flux temperature, and coupled to the water inlet valve to open and close the water inlet valve to selectively supply water to the steam generator.

2. The steam generator as claimed in claim 1, wherein the thick film heating element is cycled by the controller at a plurality of different duty cycles for generating different levels of heat energy output so that the amount of steam produced by the steam generator may be controlled.

3. The steam generator as claimed in claim 1, wherein the controller outputs a duty cycle to the heating element using feedback data such that the heating element rapidly raises the temperature of the heater plate to a temperature near, but not exceeding, the critical heat flux.

4. The steam generator as claimed in claim 1, wherein the heater plate is configured to have a high point relative to the horizontal.

5. The steam generator as claimed in claim 4, wherein a temperature sensor is mounted to the heater plate at the high point.

6. The steam generator as claimed in claim 5 wherein the temperature sensor is coupled to the controller and provides temperature feed back data to the controller.

7. The steam generator as claimed in claim 6 wherein the controller outputs a duty cycle to the thick film heating element using the temperature feedback data such that the thick film heating element rapidly raises the temperature of the heater plate to a temperature near, but not exceeding, the critical heat flux.

8. The steam generator as claimed in claim 1, wherein the heater plate is supported at an inclined angle of between 0 and 20 degrees.

9. The steam generator as claimed in claim 1, wherein the controller provides a duty cycle that alternates between two phases for opening and closing the water inlet.

10. The steam generator as claimed in claim 1, wherein the controller provides a duty cycle to open and close the water inlet valve such that the duty cycle alternates between a fill phase duty cycle and a steady state duty cycle, wherein the steady state duty cycle is relatively slower than the fill phase duty cycle such that during the fill phase water the level of water in the steam generating chamber rises and in the steady state phase the level of water in the steam generating chamber decreases.

11. A method for operating a cooking appliance having a steam generator, comprising a housing forming a steam generating chamber; a heater plate supported by the housing, the heater plate having a thick film heating element; a water inlet valve fluidly connected to the housing for selectively supplying water into the steam generating chamber; and a controller controlling the heater plate and the water inlet valve, comprising:
    pulsing the water inlet valve to supply water into the steam generating chamber in accord with a first duty cycle in order to provide a film of water over the heater plate,
    energizing the thick film heating element to rapidly raise the temperature of the heater plate to a temperature near, but not exceeding, the critical heat flux temperature,
    pulsing the water inlet valve to supply water into the steam generating chamber in accord with a second duty cycle after a predetermined time,
    wherein water supply into the steam generating chamber in accord with the second duty cycle is relatively slower than water supply into the steam generating chamber in accord with the first duty cycle, to provide a steady state of operation for the steam generator.

12. The method of operating the cooking appliance as claimed in claim 11, wherein during the steady state operation the temperature of the heater plate is monitored and in the event of an over-threshold temperature, the rate of pulsing the water inlet valve is increased.

13. The method of operating the cooking appliance as claimed in claim 11, wherein during the steady state operation the temperature of the heater plate is monitored and in the event of an over-threshold temperature, the duty cycle of the heating element is changed.

14. The method of operating the cooking appliance as claimed in claim 11, wherein the controller receives signals from a temperature sensor located on the heater plate at a high point relative to Pie horizontal and changes the control output in the event of an over-threshold temperature.

15. A method for operating a cooking appliance having a steam generator having a housing which is provided for forming a steam generating chamber, the cooking appliance having a controller, comprising:
    a water inlet valve supplying water into the steam generating chamber is pulsed in accord with a first duty cycle in order to provide a film of water over a heater plate supported by the housing within the steam generating chamber, the heater plate having a thick film heating element,
    the heating element is energized to rapidly raise the temperature of the heater plate to a temperature near, but not exceeding, the critical heat flux temperature,
    after a predetermined time, the water inlet valve is pulsed in accord with a second duty cycle, which is relatively slower than the first duty cycle, to provide a steady state of operation for the steam generator, wherein the controller receives signals from a temperature sensor located at a high point on the heater plate and changes the control output in the event of an over-threshold temperature, and wherein the controller receives a signal indicative of current leakage between the heating element and a metallic plate upon which the heating element is mounted and changes the control output in the event of a signal indicating current leakage.

* * * * *

UNITED STATES PATENT AND TRADEMARK OFFICE
CERTIFICATE OF CORRECTION

PATENT NO.        : 7,669,591 B2
APPLICATION NO.   : 11/281828
DATED             : March 2, 2010
INVENTOR(S)       : Laura Fossati et al.

It is certified that error appears in the above-identified patent and that said Letters Patent is hereby corrected as shown below:

In the Claims:

Column 8, Line 51 Claim 14: "The method of operating the cooking appliance as claimed in claim 11, wherein the controller receives signals from a temperature sensor located on the heater plate at a high point relative to Pie horizontal and changes the control output in the event of an over-threshold temperature." -- should be Column 8, Line 51 Claim 14: "The method of operating the cooking appliance as claimed in claim 11, wherein the controller receives signals from a temperature sensor located on the heater plate at a high point relative to the horizontal and changes the control output in the event of an over-threshold temperature."

Signed and Sealed this

Fifth Day of October, 2010

David J. Kappos
*Director of the United States Patent and Trademark Office*